United States Patent
Lewis

(10) Patent No.: US 10,533,428 B2
(45) Date of Patent: Jan. 14, 2020

(54) OBLONG PURGE HOLES

(71) Applicant: UNITED TECHNOLOGIES CORPORATION, Farmington, CT (US)

(72) Inventor: Scott D. Lewis, Vernon, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 131 days.

(21) Appl. No.: 15/613,923

(22) Filed: Jun. 5, 2017

(65) Prior Publication Data
US 2018/0347379 A1 Dec. 6, 2018

(51) Int. Cl.
*F01D 5/20* (2006.01)
*F01D 5/14* (2006.01)
*F01D 5/18* (2006.01)

(52) U.S. Cl.
CPC ............... *F01D 5/20* (2013.01); *F01D 5/147* (2013.01); *F01D 5/187* (2013.01); *F01D 5/18* (2013.01); *F05D 2240/307* (2013.01); *F05D 2250/12* (2013.01); *F05D 2250/14* (2013.01)

(58) Field of Classification Search
CPC . F01D 5/20; F01D 5/187; F01D 5/147; F01D 5/18; F05D 2250/14; F05D 2240/307; F05D 2250/12
See application file for complete search history.

(56) References Cited

U.S. PATENT DOCUMENTS

| | | | |
|---|---|---|---|
| 3,045,328 A | 7/1962 | Turner et al. | |
| 4,606,701 A * | 8/1986 | McClay | F01D 5/187 416/92 |
| 5,864,949 A * | 2/1999 | Kildea | F01D 5/186 29/889.7 |
| 5,927,946 A * | 7/1999 | Lee | F01D 5/20 415/115 |
| 6,190,129 B1 * | 2/2001 | Mayer | F01D 5/187 416/235 |
| 6,652,235 B1 * | 11/2003 | Keith | F01D 5/141 416/92 |
| 7,597,539 B1 | 10/2009 | Liang | |
| 8,186,965 B2 * | 5/2012 | Kuhne | F01D 5/20 415/173.1 |

(Continued)

FOREIGN PATENT DOCUMENTS

| | | |
|---|---|---|
| EP | 3009600 | 4/2016 |
| EP | 3138997 | 3/2017 |
| GB | 827289 | 2/1960 |

OTHER PUBLICATIONS

European Patent Office, European Search Report dated Nov. 2, 2018 in Application No. 18174121.6.

*Primary Examiner* — Joseph J Dallo
*Assistant Examiner* — Kurt Philip Liethen
(74) *Attorney, Agent, or Firm* — Snell & Wilmer, L.L.P.

(57) ABSTRACT

A turbine blade may comprise a pressure side wall and a suction side wall opposite the pressure side wall. A tip wall may extend between the pressure side wall and the suction side wall and may comprise a first opening. A first dimension of the first opening may be greater than a second dimension of the first opening. The first dimension may be oriented in a direction extending from a leading edge of the turbine blade toward a trailing edge of the turbine blade.

18 Claims, 7 Drawing Sheets

(56) References Cited

U.S. PATENT DOCUMENTS

| | | | |
|---|---|---|---|
| 8,469,666 B1* | 6/2013 | Liang | F01D 5/187 |
| | | | 415/115 |
| 9,085,988 B2 | 7/2015 | Kwon | |
| 10,107,108 B2* | 10/2018 | Jones | F01D 5/187 |
| 2003/0021684 A1 | 1/2003 | Downs | |
| 2016/0230564 A1 | 8/2016 | Mongillo, Jr. et al. | |
| 2017/0058680 A1* | 3/2017 | Chouhan | F01D 5/20 |

* cited by examiner

OBLONG PURGE HOLES

FIELD

The present disclosure relates generally to components of gas turbine engines and, more specifically, to turbine blades including tip walls with oblong openings.

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

The compressor section and/or the turbine section may include rotatable blades and stationary vanes. A blade outer air seal (BOAS) may be mounted within the engine casing, and positioned in close proximity to the outermost tips of the rotatable blades. Space between the BOAS and the blade tips may be maintained to avoid the blade tips rubbing against the BOAS due to the expansion of the blade relative to the BOAS. However, the efficiency of the gas turbine engine may be undesirably affected by having a large tip clearance between the blade tips and the BOAS, as the hot gas flow may leak through the space between the blade tip and the BOAS.

SUMMARY

A turbine blade may comprise a pressure side wall and a suction side wall opposite the pressure side wall. A tip wall may extend between the pressure side wall and the suction side wall and may comprise a first opening having an oblong shape. A first dimension of the first opening may be greater than a second dimension of the first opening. The first dimension may be oriented in a direction extending from a leading edge of the turbine blade toward a trailing edge of the turbine blade.

In various embodiments, the first opening may comprise a first semi-circular end having a first radius, a second semi-circular end opposite the first semi-circular end, a first sidewall extending from the first semi-circular end to the second semi-circular end, and a second sidewall parallel to the first sidewall and extending from the first semi-circular end to the second semi-circular end. A ratio of a length of the first sidewall to the first radius may be between 1:1 and 28:1.

In various embodiments, the tip wall may further comprise a second opening. A first surface area of the first opening may be equal to a second surface area of the second opening. A first surface area of the first opening may be greater than a second surface area of the second opening. The first opening may be disposed closer to the leading edge of the turbine blade than the second opening. The first opening may be disposed closer to the pressure side wall of the turbine blade than the second opening. A tip pocket may be formed in the tip wall. The first opening may be located in the tip pocket and the second opening may be located outside the tip pocket.

A gas turbine engine may comprise a turbine including a turbine rotor assembly. The turbine rotor assembly may comprise a turbine disk and a blade coupled to the turbine disk. The blade may include a first opening formed in a tip wall of the blade. The first opening may comprise a first dimension and a second dimension less than the first dimension. The first dimension may be oriented in a direction extending from a leading edge of the blade toward a trailing edge of the blade. A BOAS may be disposed around the turbine rotor assembly.

In various embodiments, the first opening may direct an airflow from the blade toward the BOAS. A ratio of the first dimension to the second dimension may be between 1.5:1 and 15:1. A tip pocket may be formed in the tip wall of the blade. A second opening may be located in the tip pocket. A first surface area of the second opening may be greater than a second surface area of the first opening. A first surface area of the second opening may be less than a second surface area of the first opening. A first surface area of the second opening may be equal to a second surface area of the first opening.

A method of making a turbine blade may comprise forming a tip wall extending between a pressure side of the turbine blade and a suction side of the turbine blade, and forming a first opening in the tip wall. The first opening may comprise an oblong shape. A first dimension of the first opening may be oriented in a direction extending from a leading edge of the turbine blade toward a trailing edge of the turbine blade.

In various embodiments, the method may further comprise forming a tip pocket in the tip wall. The method may further comprise forming a second opening in the tip pocket.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials. Throughout the present disclosure, like reference numbers denote like elements. Accordingly, elements with like element numbering may be shown in the figures, but may not be necessarily be repeated herein for the sake of clarity.

As used herein, "aft" refers to the direction associated with the tail (i.e., the back end) of an aircraft, or generally, to the direction of exhaust of the gas turbine engine. As used herein, "forward" refers to the direction associated with the nose (i.e., the front end) of an aircraft, or generally, to the direction associated with the intake of a gas turbine engine. As used herein, "distal" refers to the direction outward, or generally, away from a reference component. As used herein, "proximal" and/or "proximate" refers to a direction inward, or generally, towards the reference component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis.

Figure 1:
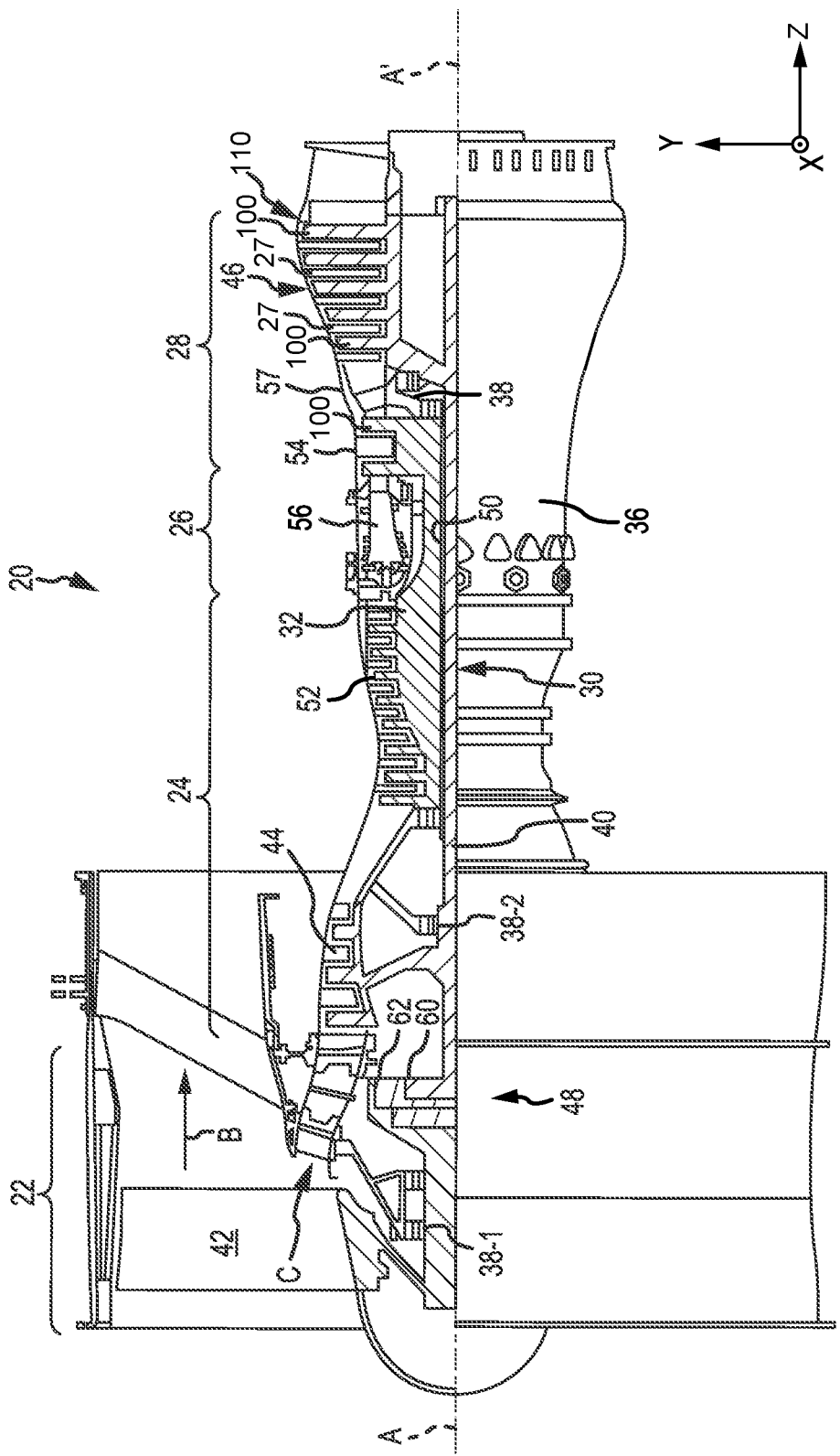
FIG. 1 illustrates a cross-section view of an exemplary gas turbine engine, in accordance with various embodiments.

With reference to FIG. 1, a gas turbine engine 20 is shown according to various embodiments. Gas turbine engine 20 may be a two-spool turbofan that generally incorporates a fan section 22, a compressor section 24, a combustor section 26, and a turbine section 28. Alternative engines may include, for example, an augmentor section among other systems or features. In operation, fan section 22 can drive coolant (e.g., air) along a path of bypass airflow B while compressor section 24 can drive coolant along a core flowpath C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 (also referred to as an engine casing structure) via several bearing systems 38, 38-1, and 38-2. Engine central longitudinal axis A-A' is oriented in the z direction on the provided xyz axes. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44, and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. As used herein, a "high pressure" compressor or turbine experiences a higher pressure than a corresponding "low pressure" compressor or turbine.

A combustor 56 may be located between high pressure compressor 52 and high pressure turbine 54. A mid-turbine frame 57 of engine casing structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Each of the compressor section 24 and the turbine section 28 may include alternating rows of rotor assemblies and vane assemblies (shown schematically) that carry airfoils that extend into the core flow path C. For example, the rotor assemblies in the turbine section 28 may carry a plurality of rotating blades 100, and each vane assembly may carry a plurality of stationary vanes 27 that extend into the core flow path C. The blades 100 of the rotor assemblies in the turbine section create or extract energy (in the form of pressure) from the core airflow that is communicated through the gas turbine engine 20 along the core flow path C. The vanes 27 of the vane assemblies direct the core airflow to the blades 100 to either add or extract energy.

Various components of a gas turbine engine 20, including but not limited to the blades 100 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling circuits for cooling the parts during engine operation.

Turbine blades of the present disclosure may include oblong openings formed in the tip of the turbine blade. The oblong openings may be positioned with a longer dimension of the openings extending generally from a leading edge toward a trailing edge. The oblong shape of the openings may cool and protect a greater area of the blade, as compared to circular-shaped openings of the same surface area. The oblong shape of the openings may also decrease gas leakage over the blade tip, which may lead to increased engine efficiency.

Figure 2:
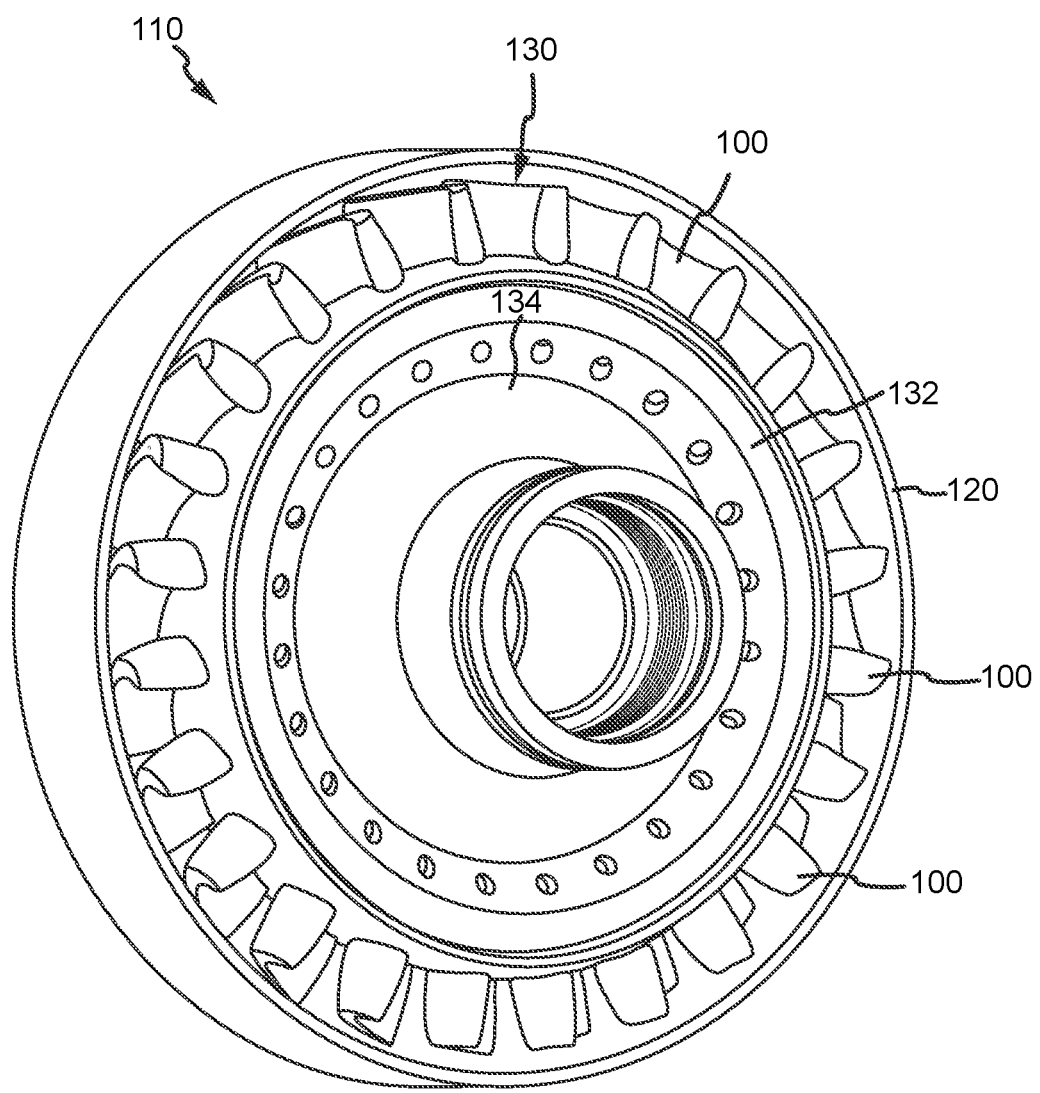
FIG. 2 illustrates a perspective view of an exemplary turbine rotor assembly of a gas turbine engine, in accordance with various embodiments.

FIG. 2 is a perspective of a turbine rotor section 110 of gas turbine engine 20 in FIG. 1, as viewed forward to aft. The turbine rotor section 110 includes a blade outer air seal (BOAS) 120 surrounding a turbine rotor assembly 130. Turbine rotor assembly 130 may comprise a blade ring 132, a turbine disk 134, and a plurality of blades 100. Blades 100 may be coupled to turbine disk 134. BOAS 120 may be configured as a cylindrical shroud and may be disposed concentric to turbine rotor assembly 130. A radial gap (i.e., a blade running clearance) may be located between an outermost diameter of turbine rotor assembly 130 and BOAS 120 (i.e., between a tip end of blades 100 and a radially inward surface of BOAS 120).

Figure 3A:
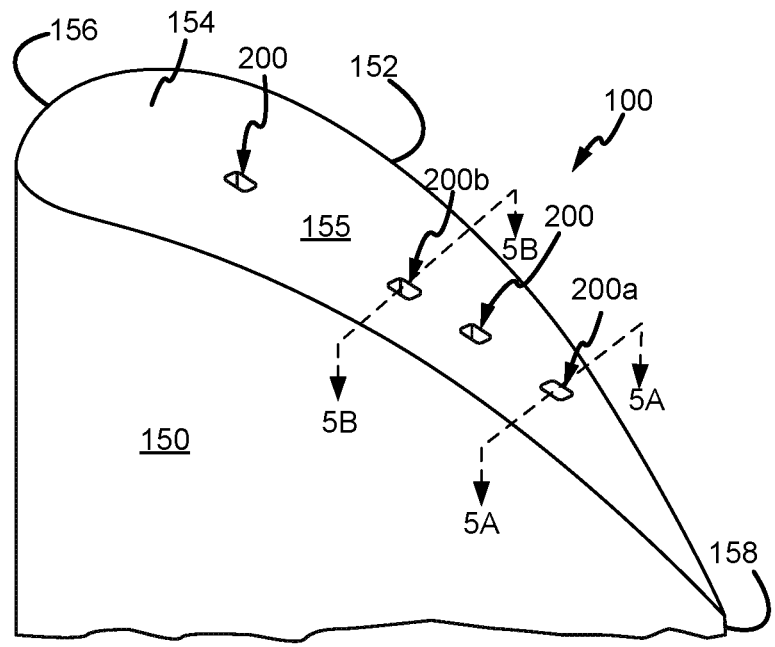
FIGS. 3A and 3B illustrate a perspective view and a plan view, respectively, of a turbine blade with oblong openings, in accordance with various embodiments.
Figure 3B:
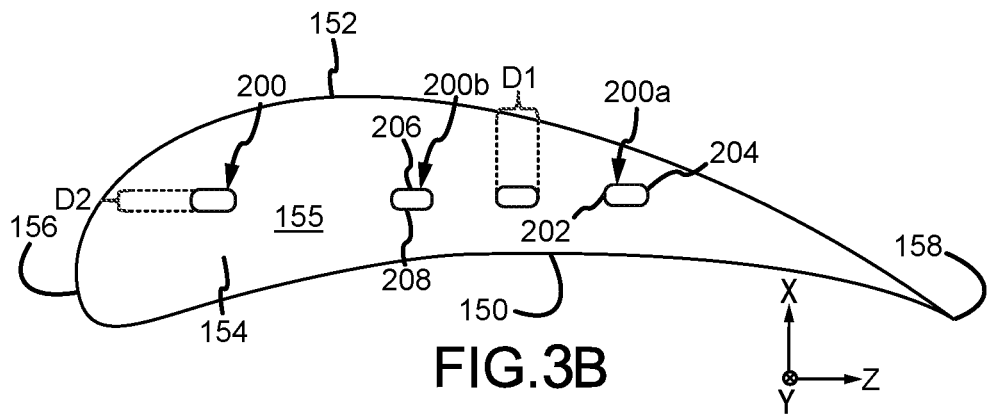

FIGS. 3A and 3B illustrate a perspective pressure side view and a plan view, respectively, of a turbine blade 100 having oblong openings, in accordance with various embodiments. Blade 100 comprises a pressure side wall 150 (also referred to as a pressure side), a suction side wall 152 (also referred to as a suction side) opposite the pressure side wall 150, and a tip wall 154 (also referred to as a blade tip) extending between the pressure side wall 150 and the suction side wall 152. In various embodiments, pressure side wall 150 may be concave and suction side wall 152 may be convex. Blade 100 further comprises a leading edge 156 and a trailing edge 158 opposite the leading edge 156. Leading edge 156 may be oriented forward of trailing edge 158. A radially outward surface 155 of tip wall 154 may extend between leading edge 156 and trailing edge 158 and between pressure side 150 and suction side 152. Tip wall 154 and surface 155 may be oriented radially inward of BOAS 120, with momentary reference to FIG. 2, and away from engine central longitudinal axis A-A', with momentary reference to FIG. 1.

One or more openings 200 may be formed in tip wall 154 using any suitable manner. Openings 200 may be formed during the manufacturing of blade 100. For example, in various embodiments, manufacturing blade 100 may comprise forming a ceramic core and then pouring a metal around the ceramic core. Rods may be placed in the mold when the ceramic core is formed, and the ceramic core may harden with the rods attached therein. The rods may hold the ceramic core in place while the metal, which will ultimately form the blade, is poured. The rods tend to prevent the ceramic core from moving during application of the metal. Preventing movement of the ceramic core tends to increase wall thickness precision and wall thickness accuracy when forming blades 100. Once the metal cools and/or hardens, the ceramic core and rods are removed by leaching, leaving the metal blade. In various embodiments, a location of openings 200 corresponds to the location of the rods in the ceramic core, and a shape of openings 200 corresponds to the shape of the rods.

Figure 3C:
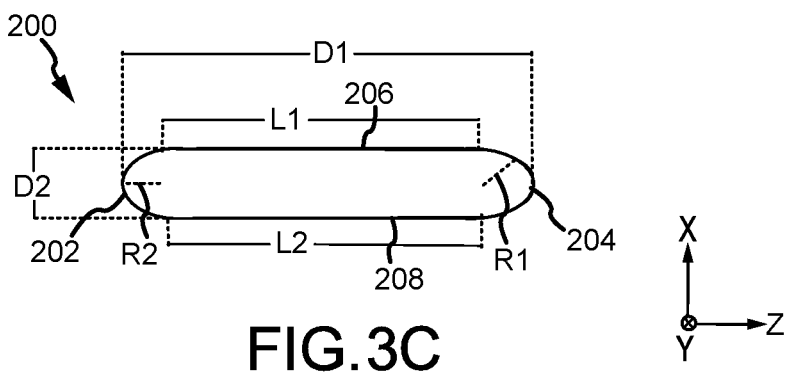
FIG. 3C illustrates an oblong opening for a turbine blade tip, in accordance with various embodiments.

In accordance with various embodiments, FIG. 3C illustrates an opening 200. Opening 200 (and the rods that form openings 200) may be oblong. Stated another way, a first dimension D1 of opening 200 may be greater than a second dimension D2 of opening 200. In various embodiments, a ratio of dimension D1 to dimension D2 may be between 1.5:1 and 15:1. In various embodiments, a ratio of dimension D1 to dimension D2 may be between 2:1 and 10:1.

Opening 200 may comprise a first semi-circular end 202 and a second semi-circular end 204 opposite first semi-circular end 202. First semi-circular end 202 may have a radius R1. Second semi-circular end 204 may have a radius R2. In various embodiments, radius R1 may be equal to radius R2. A first sidewall 206 and a second sidewall 208 may connect semi-circular ends 202 and 204. First sidewall 206 may be parallel to second sidewall 208. Sidewall 206 may include a length L1 that extends from first semi-circular end 202 to second semi-circular end 204. Sidewall 208 may include a length L2 that extends from first semi-circular end 202 to second semi-circular end 204. Length L1 of sidewall 206 may be equal to length L2 of sidewall 208. In various embodiments, a ratio of length L1 to radius R1 may be between 1:1 and 28:1. In various embodiments, a ratio of length L1 to radius R1 may be between 2:1 and 18:1.

With reference to FIG. 3B, openings 200 may be positioned in tip wall 154 with the greater dimension D1 of opening 200 oriented in a direction extending from leading edge 156 toward trailing edge 158, and with the smaller dimension D2 of opening 200 oriented in a direction extending from pressure side 150 toward suction side 152. The oblong shape of openings 200, as compared to openings having a circular shape (i.e., openings having equal dimensions in the pressure side to suction side direction and in the leading edge to trailing edge direction), may provide increased blade cooling and increased engine efficiency. For example, during operation, a cooling flow (e.g., a cooling airstream) may exit opening 200 normal to the surface of tip wall 154. The cooling gas may then be pushed aft due to the hot gas path flow. The cooling flow expelled from openings 200 may extend to the internal surface of BOAS 120, with momentary reference to FIG. 2, and may block hot gasses flowing from pressure side 150 to suction side 152 over blade tip 154. The oblong shape of openings 200 tends to create a larger effective blockage, as compared to circular openings of the same surface area as measured along surface 155. The larger effective blockage tends to reduce an amount of hot gas flow, or leakage, over blade tip 154.

In various embodiments, openings 200 with a greater dimension D1 may be disposed in areas of tip wall 154 that are more susceptible to hot gas flow leakage or areas that may provide more efficient blocking of hot gas flow over blade tip 154. For example, a ratio of dimension D1 to dimension D2 may be greater in openings 200 that are proximate to leading edge 156, as compared to openings 200 that are proximate to trailing edge 158. In various embodiments, a ratio of dimension D1 to dimension D2 may be greater in openings 200 that are proximate to pressure side 150, as compared to openings 200 that are proximate to suction side 152.

Hot gas flow that leaks over blade tip 154 tends to have an associated performance penalty because the leaked hot gas flow does not provide as much work to turbine blades 100 as hot gas flow that does not go over the blade tips. In this manner, the oblong shape of openings 200 may increase an aerodynamic efficiency of gas turbine engine 20 (FIG. 1) as the air flow from openings 200 decreases hot gas flow leakage over tip wall 154 and/or reduces a leakage of hot gas flow over blade tips 154. Stated another way, the cooling airflow expelled from oblong openings 200 may cover more area between the leading edge and trailing edge of blade 100, as compared to the airflow expelled from circular-shaped openings of the same surface area. The larger coverage area may block more hot gas flow and/or reduce an amount of hot gas flow leaking over blade tips 154.

Oblong openings 200 may also provide improved cooling of blade 100. The cooling flow from openings 200 may create a cooling film over tip wall 154 (i.e., a cooling air flow covering portions of tip wall 154). The cooling film formed by oblong openings 200 tends to provide a greater coverage area and protect a greater surface area of tip wall 154 from the hot combustion gases, as compared to the cooling film formed by circular openings of the same surface area. Cooling and/or protecting a greater surface area of tip wall 154 from hot gasses may decrease thermal heat load of blades 100 and may increase a total life of blades 100.

In various embodiments, each opening 200 may be about an equal distance away from suction side 152. As used here "about an equal distance" means±1.0 millimeter (mm). In various embodiments, a first opening 200a may be a greater distance from suction side 152 than a second opening 200b. In various embodiments, openings 200 may be formed with equal surface area. In other words, a cross-sectional area of first opening 200a at surface 155 of tip wall 154 (i.e., the area of a cross-section of first opening 200a in the XZ plane at surface 155) may be equal to the cross-sectional area of the other openings 200 at surface 155. In various embodiments, openings 200 may comprise a constant a cross-sectional area through the tip wall 154.

Figure 5A:
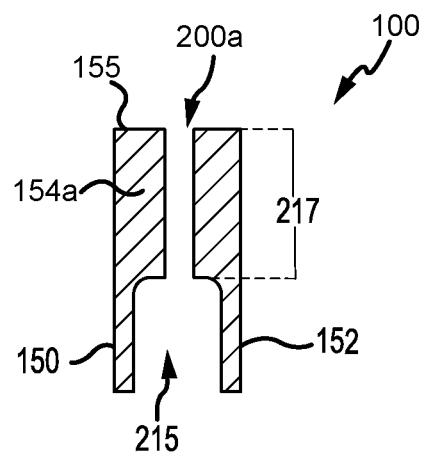
FIGS. 5A and 5B illustrate cross-sections of the turbine blade of FIG. 3A taken along line 5A-5A and line 5B-5B, respectively, in FIG. 3A, in accordance with various embodiments.
Figure 5B:
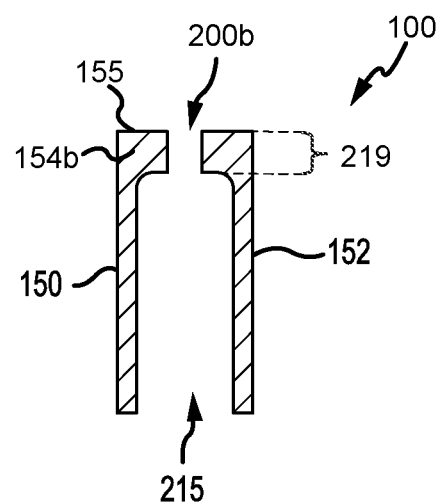

Openings 200 may also vary in surface area. In various embodiments, openings 200 with greater surface area may be formed in, or proximate to, thicker portions of tip wall 154. With reference to FIGS. 5A and 5B, tip wall 154 may vary in thickness due to, for example, variance in the radial length of an internal chamber 215 within blade 100. In various embodiments, a first portion 154a of tip wall 154 may have a thickness 217 extending from internal chamber 215 to surface 155, and a second portion 154b of tip wall 154 may have a thickness 219 extending from internal chamber 215 to surface 155 that is less than thickness 217. First opening 200a may be formed in first portion 154a and may have a greater area than a second opening 200b formed in second portion 154b. Disposing openings with greater area in, or close to, thicker portions of tip wall 154 may increase cooling of blade 100.

Figure 4A:
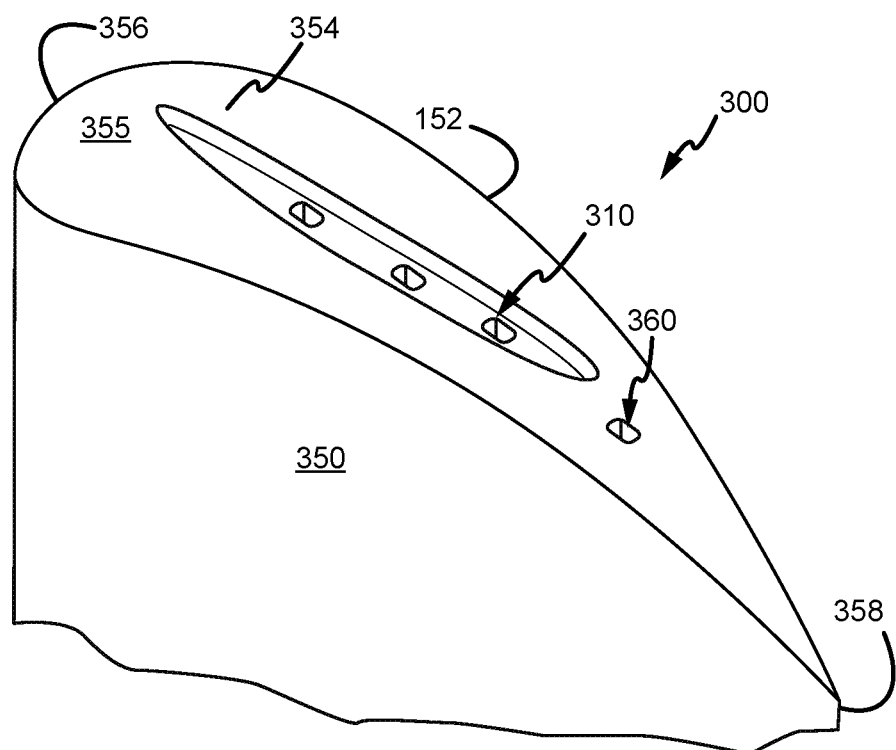
FIGS. 4A and 4B illustrate perspective views of a turbine blade having a squealer pocket with oblong tip openings, in accordance with various embodiments.
Figure 4B:
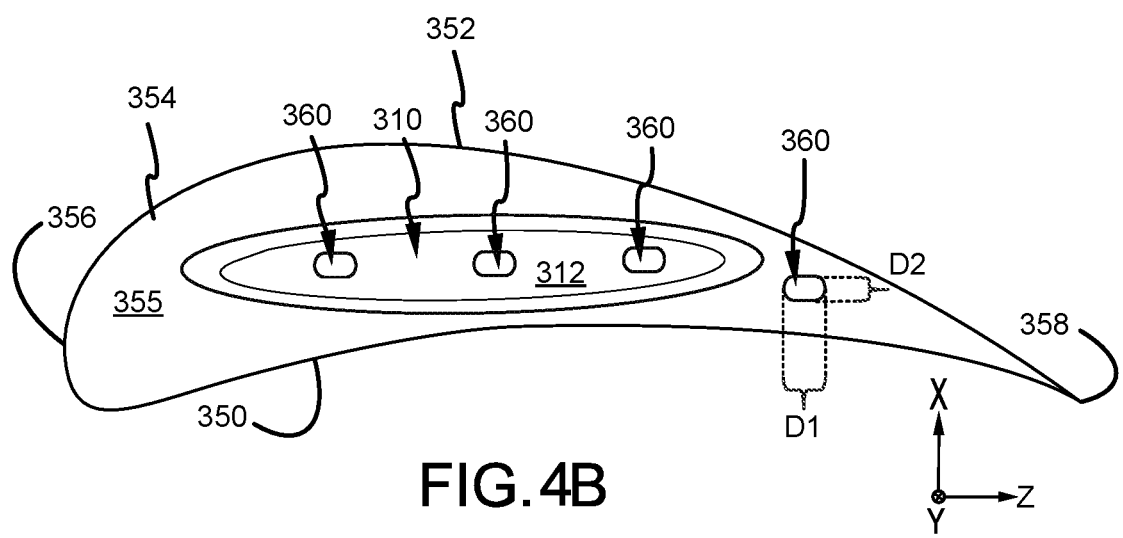

FIGS. 4A and 4B illustrate a perspective pressure side view and a perspective radially inward view, respectively, of a blade 300 having a squealer pocket and oblong openings, in accordance with various embodiments. Blade 300 comprises a pressure side wall 350 (also referred to as a pressure side), a suction side wall 352 (also referred to as a suction side) opposite the pressure side wall 350, and a tip wall 354 (also referred to as a blade tip) extending between and coupling the pressure side wall 350 and the suction side wall 352. In various embodiments, pressure side wall 350 may be concave and suction side wall 352 may be convex. Blade 300 further comprises a leading edge 356 and a trailing edge 358 opposite the leading edge 356. Leading edge 356 may be oriented forward trailing edge 358. Blade tip 354 may be oriented radially outward. Stated another way, with momentary reference to FIG. 2, blade 300 may be included in turbine rotor assembly 130 and blade tip 354 may radially inward relative to BOAS 120. Stated yet another way, blade tip 354 may be oriented away from engine central longitudinal axis A-A', with momentary reference to FIG. 1.

In various embodiments, tip wall 354 may comprise a squealer or semi-squealer tip having a tip pocket 310 (also referred to as a squealer tip pocket). Tip pocket 310 may comprise a recessed area formed in tip wall 354. A surface 312 of tip pocket 310 may be recessed with respect to a radially outward surface 355 of tip wall 354. In various embodiments, a thermal barrier coating may be disposed in tip pocket 310.

A plurality of oblong openings 360, similar to openings 200 in FIG. 3C, may be formed in tip wall 354 and in tip pocket 310. Openings 360 may be formed and/or positioned in tip wall 354 and tip pocket 310 with the greater dimension D1 of openings 360 oriented in a direction extending from leading edge 356 toward trailing edge 358 and the smaller dimension D2 of opening 360 oriented in direction extending from pressure side 350 toward suction side 352.

In various embodiments, the position of openings 360, number of openings 360, size of openings 360, and distribution of openings 360 in tip wall 354 and in tip pocket 310 may be selected to provide predetermined amounts of cooling and/or gas flow blocking to various portions of blade 300. For example, if blade 300 may benefit from more cooling, then a greater number openings 360 and/or openings 360 with greater surface area may be located in tip pocket 310. If blade 300 and/or gas turbine engine 20 (FIG. 1) may benefit from blocking a greater amount hot gas flow (i.e., reducing hot gas leakage over tip wall 354), then a great number of openings 360 and/or openings 360 with greater surface area may be located in tip wall 354 (i.e., outside tip pocket 310).

In various embodiments, openings 360 with a greater dimension D1 may be disposed in areas of tip wall and/or tip pocket 310 that are more susceptible to hot gas flow leakage and/or in areas that may provide more efficient blocking of hot gas flow over blade tip 354. For example, a ratio of dimension D1 to dimension D2 may be greater in openings 360 that are proximate to leading edge 356, as compared to a ratio of dimension D1 to dimension D2 in openings 360 that are proximate to trailing edge 358. In various embodiments, a ratio of dimension D1 to dimension D2 may be greater in openings 360 that are proximate to pressure side 350, as compared to a ratio of dimension D1 to dimension D2 in openings 360 that are proximate to suction side 352. Hot gas flow that leaks over blade tip 354 tends to have an associated performance penalty because the leaked hot gas flow does not provide as much work to turbine blades 300 as hot gas flow that does not go over the blade tips. In this manner, the oblong shape of openings 360 may increase an aerodynamic efficiency of gas turbine engine 20 (FIG. 1) as the air flow from openings 200 covers a greater leading edge to trailing edge distance and may block more hot gas flow and/or reduce an amount of hot gas flow leaking over blade tips 354.

In various embodiments, openings 360 with a greater dimension D1 may be disposed in areas of tip wall 354 and/or tip pocket 310 that would benefit from increased cooling. For example, a ratio of dimension D1 to dimension D2 may be greater in openings 360 that are proximate to thicker portions of tip wall 354, as compared to openings 360 that are proximate to thinner portions of tip wall 354.

The cooling film formed from oblong openings 360 tends to provide a greater coverage area and/or protect a greater surface area of tip wall 354 from the hot combustion gases, as compared to the cooling film formed by circular-shaped openings of the same surface area. Cooling and/or protecting a greater surface area of tip wall 354 from hot gasses tends to decrease thermal load of blades 300 and may increase a total life of blades 300.

Figure 6A:
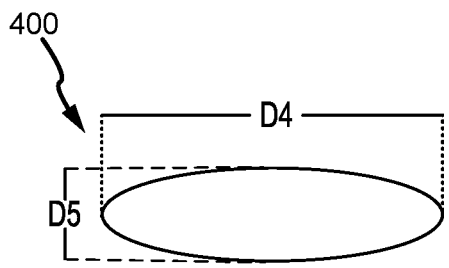
FIGS. 6A, 6B, 6C, 6D, and 6E illustrate oblong openings, in accordance with various embodiments.

FIGS. 6A, 6B, 6C, 6D, and 6E illustrate oblong openings, in accordance with various embodiments. FIG. 6A shows an oblong opening 400 comprising an oval shape (i.e., an oval-shaped cross-section). A dimension D4 of openings 400 may be greater than a dimension D5 of openings 400. One or more openings 400 may be formed in a tip wall similar to openings 200 of FIG. 3A, and/or in a tip pocket, similar to openings 360 of FIG. 4A. Openings 400 may be positioned with the greater dimension D4 oriented from the leading edge of the blade toward the trailing edge of the blade.

Figure 6B:
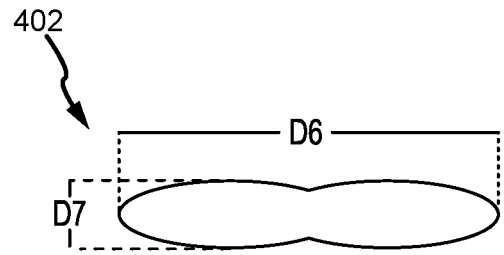

FIG. 6B shows an oblong opening 402 having a figure-eight shape (i.e., a figure-eight-shaped cross-section). A dimension D6 of openings 402 may be greater than a dimension D7 of openings 402. One or more openings 402 may be formed in a tip wall, similar to openings 200 of FIG. 3A, and/or in a tip pocket, similar to openings 360 of FIG. 4A. Openings 402 may be positioned with the greater dimension D6 oriented from the leading edge of the blade toward the trailing edge of the blade.

Figure 6C:
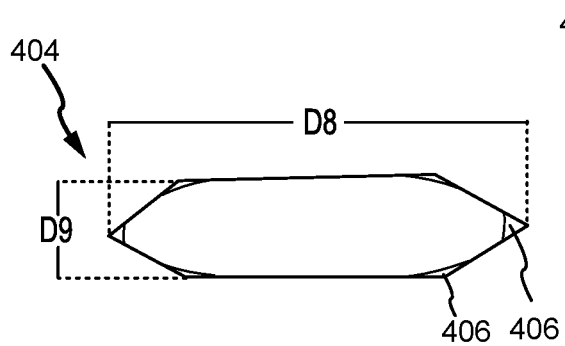

FIG. 6C shows an oblong opening 404 having a hexagonal shape (i.e., a hexagon-shaped cross-section). A dimension D8 of openings 404 may be greater than a dimension D9 of openings 404. In various embodiments, a fillet 406 may be formed in one or more of the corners of openings 404. One or more openings 404 may be formed in a tip wall, similar to openings 200 of FIG. 3A, and/or in a tip pocket, similar to openings 360 of FIG. 4A. Openings 404 may be positioned with the greater dimension D8 oriented from the leading edge of the blade toward the trailing edge of the blade.

Figure 6D:
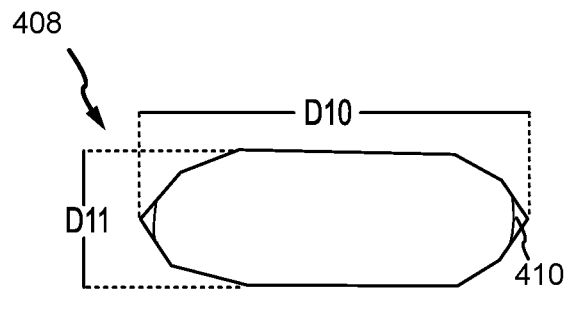

FIG. 6D shows an oblong opening 408 having an decagonal shape (i.e., an decagon-shaped cross-section). A dimension D10 of openings 408 may be greater than a dimension D11 of openings 408. In various embodiments, a filet 410 may be formed in one or more of the corners of openings 408. One or more openings 408 may be formed in a tip wall, similar to openings 200 of FIG. 3A, and/or in a tip pocket, similar to openings 360 of FIG. 4A. Openings 408 may be positioned with the greater dimension D10 oriented from the leading edge of the blade toward the trailing edge of the blade.

Figure 6E:
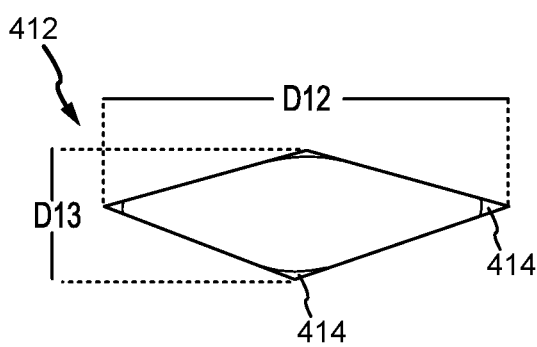

FIG. 6E shows an oblong opening 412 having a diamond shape (i.e., a diamond-shaped cross-section). A dimension D12 of openings 412 may be greater than a dimension D13 of openings 412. In various embodiments, a fillet 414 may be formed in one or more of the corners of openings 412. One or more openings 412 may be formed in a tip wall, similar to openings 200 of FIG. 3A, and/or in a tip pocket, similar to openings 360 of FIG. 4A. Openings 412 may be positioned with the greater dimension D12 oriented from the leading edge of the blade toward the trailing edge of the blade. The openings illustrated in FIG. 3C, and FIGS. 6A-6E are provided as examples of oblong openings, it should be understood that any shape opening comprising a first dimension greater than a second dimension may be formed in a tip wall and/or tip pocket.

Figure 7:
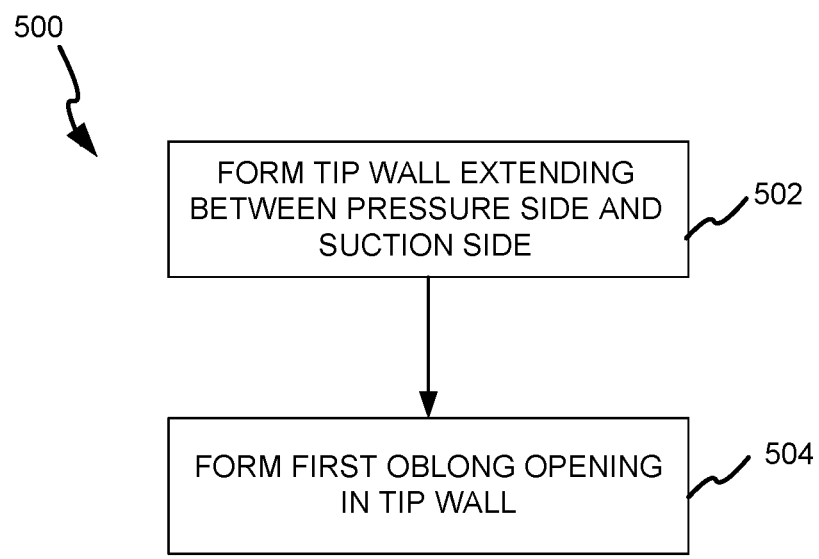
FIGS. 7 and 8 illustrate a method of making a turbine blade having oblong openings, in accordance with various embodiments.

FIG. 7 illustrates a method 500 of making a turbine blade, in accordance with various embodiments. Method 500 may comprise forming a tip wall extending from a pressure side of the turbine blade to a suction side of the turbine blade (step 502), and forming a first opening in the tip wall (step 504). In various embodiments, the first opening may comprise a first dimension and a second dimension less than the first dimension. The first dimension may be oriented in a direction extending from a leading edge of the turbine blade to a trailing edge of the turbine blade.

In various embodiments, with combined reference to FIG. 7 and FIG. 3B, step 502 may include forming tip wall 154 extending from pressure side 150 to suction side 152 of blade 100. Step 504 may comprise forming a first opening 200a in tip wall 154. First opening 200a may comprise first dimension D1 and second dimension D2. Dimension D1 may be oriented in a direction extending from leading edge 156 to trailing edge 158.

Figure 8:
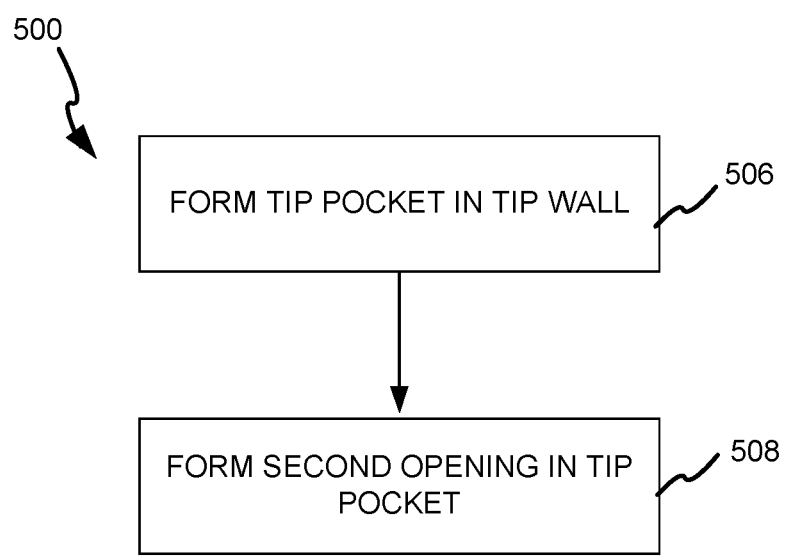

With reference to FIG. 8, in various embodiments, method 500 may further comprise forming a tip pocket in the tip wall (step 506), and forming a second opening in the tip pocket (step 508). In various embodiments, with combined reference to FIG. 8 and FIG. 4B, step 506 may include forming tip pocket 310 in tip wall 354. Step 508 may including forming opening 360 in tip pocket 310.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A turbine blade, comprising;
    a pressure side wall;
    a suction side wall opposite the pressure side wall; and
    a tip wall extending between the pressure side wall and the suction side wall and comprising a first opening formed in a first portion of the tip wall and a second opening formed in a second portion of the tip wall, wherein a radial thickness of the first portion of the tip wall is greater than a radial thickness of the second portion of the tip wall, wherein a first dimension of the first opening is greater than a second dimension of the first opening, and wherein the first dimension of the first opening is oriented in a direction extending from a leading edge of the turbine blade toward a trailing edge of the turbine blade, and wherein a first cross-sectional area of the first opening is greater than a second cross-sectional area of the second opening, and wherein a first dimension of the second opening is greater than a second dimension of the second opening, the first dimension of the second opening being oriented in the direction extending from the leading edge of the turbine blade toward the trailing edge of the turbine blade.

2. The turbine blade of claim 1, wherein the first opening comprises:
    a first semi-circular end having a first radius;
    a second semi-circular end opposite the first semi-circular end;
    a first sidewall extending from the first semi-circular end to the second semi-circular end; and
    a second sidewall parallel to the first sidewall and extending from the first semi-circular end to the second semi-circular end.

3. The turbine blade of claim 2, wherein a ratio of a length of the first sidewall to the first radius is between 1:1 and 28:1.

4. The turbine blade of claim 1, wherein a ratio of the first dimension of the first opening to the second dimension of the first opening is greater than a ratio of the first dimension of the second opening to the second dimension of the second opening.

5. The turbine blade of claim 1, further including a tip pocket formed in the tip wall, wherein the second opening is located in the tip pocket and the first opening is located outside the tip pocket.

6. The turbine blade of claim 1, wherein the first opening is located closer to the leading edge of the turbine blade as compared to the second opening.

7. The turbine blade of claim 1, wherein the first opening is located closer to the pressure side wall of the turbine blade as compared to the second opening.

8. The turbine blade of claim 1, wherein the first cross-sectional area of the first opening is constant through the tip wall.

9. A gas turbine engine, comprising:
    a turbine including a turbine rotor assembly, the turbine rotor assembly comprising:
        a turbine disk, and
        a blade coupled to the turbine disk, the blade including a first opening formed in a first portion of a tip wall of the blade and a second opening formed in a second portion of the tip wall, the first opening comprising a first dimension and a second dimension less than the first dimension, wherein the first dimension of the first opening is oriented in a direction extending from a leading edge of the blade toward a trailing edge of the blade, and wherein a first cross-sectional area of the first opening is greater than a second cross-sectional area of the second opening, and wherein a radial thickness of the first portion of the tip wall is greater than a radial thickness of the second portion of the tip wall, and wherein a ratio of the first dimension of the first opening to the second dimension of the first opening is greater than a ratio of a first dimension of the second opening to a second dimension of the second opening; and
    a blade outer air seal (BOAS) disposed around the turbine rotor assembly.

10. The gas turbine engine of claim 9, wherein the first opening directs an airflow from the blade toward the BOAS.

11. The gas turbine engine of claim 9, wherein the ratio of the first dimension of the first opening to the second dimension of the first opening is between 1.5:1 and 15:1.

12. The gas turbine engine of claim 9, further comprising a tip pocket formed in the tip wall of the blade.

13. The gas turbine engine of claim 12, wherein the second opening is located in the tip pocket.

14. The gas turbine engine of claim 9, wherein the first opening is located closer to a pressure side wall as compared to the second opening.

15. The gas turbine engine of claim 9, wherein the first opening is located closer to the leading edge of the blade as compared to the second opening.

16. A method of making a turbine blade, comprising:
    forming a tip wall extending between a pressure side of the turbine blade and a suction side of the turbine blade;
    forming a first opening in a first portion of the tip wall, the first opening comprising a first dimension and a second dimension less than the first dimension of the first opening, wherein the first dimension of the first opening is oriented in a direction extending from a leading edge of the turbine blade toward a trailing edge of the turbine blade; and
    forming a second opening in a second portion of the tip wall, the second opening comprising a first dimension and a second dimension less than the first dimension of the second opening, wherein the first dimension of the second opening is oriented in the direction extending from the leading edge of the turbine blade toward the trailing edge of the turbine blade, and wherein a first cross-sectional area of the first opening is greater than a second cross-sectional area of the second opening, and wherein a radial thickness of the first portion of the tip wall is greater than a radial thickness of the second portion of the tip wall.

17. The method of claim 16, further comprising forming a tip pocket in the tip wall.

18. The method of claim 17, further comprising forming the second opening in the tip pocket.

* * * * *